US010248894B2

(12) United States Patent
Chatcavage et al.

(10) Patent No.: US 10,248,894 B2
(45) Date of Patent: Apr. 2, 2019

(54) RASTER PIXEL OBJECT IDENTIFICATION MECHANISM (71) Applicants: Edward Chatcavage, Buckeye, AZ (US); Justin James Coulter, Longmont, CO (US)

(72) Inventors: Edward Chatcavage, Buckeye, AZ (US); Justin James Coulter, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 6 days.

(21) Appl. No.: 15/051,970

(22) Filed: Feb. 24, 2016

(65) Prior Publication Data
US 2017/0243090 A1    Aug. 24, 2017

(51) Int. Cl.
*G06K 15/00* (2006.01)
*G06K 15/02* (2006.01)
*G06F 3/12* (2006.01)
*H04N 1/32* (2006.01)
*H04N 1/56* (2006.01)

(52) U.S. Cl.
CPC ....... *G06K 15/1867* (2013.01); *G06F 3/1208* (2013.01); *G06F 3/1247* (2013.01); *G06K 15/1831* (2013.01); *G06K 15/1836* (2013.01); *G06K 15/4015* (2013.01); *H04N 1/32128* (2013.01); *H04N 1/56* (2013.01); *G06F 3/1279* (2013.01)

(58) Field of Classification Search
None
See application file for complete search history.

(56) References Cited

U.S. PATENT DOCUMENTS

| 6,429,950 | B1 | 8/2002 | Ebner |
| 7,425,955 | B2 | 9/2008 | Long et al. |
| 7,612,926 | B2 | 11/2009 | Jodra et al. |
| 8,130,394 | B2 | 3/2012 | Matsuda |
| 8,384,739 | B2 | 2/2013 | Maresch |
| 9,036,202 | B2 | 5/2015 | Nishide |
| 2007/0086638 | A1 | 4/2007 | Ackley et al. |
| 2010/0073743 | A1* | 3/2010 | Koyatsu ............... H04N 1/6016 358/518 |
| 2014/0085648 | A1 | 3/2014 | Kawamura |

FOREIGN PATENT DOCUMENTS

| JP | 2000172457 | 6/2000 |
| JP | 2011090383 | 10/2009 |
| JP | 2010093801 | 4/2010 |

* cited by examiner

*Primary Examiner* — Barbara D Reinier
(74) *Attorney, Agent, or Firm* — Jaffery Watson Mendonsa & Hamilton LLC (57) ABSTRACT A printing system is disclosed. The printing system includes an interpreter module to generate Tagged Object Bit-plane data corresponding to drawing objects for each colorant of a device color space during rasterization a print job data and a common buffer to store the Tagged Object Bit-plane data for each colorant.

20 Claims, 6 Drawing Sheets

RASTER PIXEL OBJECT IDENTIFICATION MECHANISM

FIELD OF THE INVENTION

The invention relates to the field of image processing, and in particular, to image rasterization and rendering.

BACKGROUND

Print systems include presentation architectures that are provided for representing documents in a data format that is independent of the methods that are utilized to capture or create those documents. Examples of presentation systems (or Page Description Languages (PDLs)) include Portable Document Format (PDF) and PostScript (PS). According to these systems, documents may include mixed content data objects.

Image transforms perform a rasterization to transform a PDL or Image Data Format (e.g., Tagged Image File Format (TIFF) or Joint Photographic Experts Group (JPEG)) data stream into a raster bit plane for each colorant produced by a device. In a PDL, the mixed content data objects include text, image, graphics, smooth shades and blended transparent regions. Thus, it is desirable to identify the object type of each pixel in the raster bit plane to perform post rasterization functions, such as selective screening per object type.

Typically, the object type information is stored in a separate bit-plane, referred to as the Tagged Object Bit-plane. The Tagged Object Bit-plane is a 2-bit per pixel bit-plane where four object types (image, text, graphics and smooth shade) can be identified. The Tagged Object Bit-plane is generated during rasterization. However, a problem is encountered during generation in that types are applied using either a Separation or DeviceN color space, and individual colorant Tagged Object Bit-planes may have different object types for each colorant.

For example, for an image described using DeviceCMYK at a cyan, magenta, yellow and black (CMYK) output device, all of the pixels describing the image in all four colorants may be marked as having an object type of Image. However, if a text object having a Separation/Magenta color space is applied on top of the image with overprinting enabled, only the pixels in the Magenta Tagged Object Bit-plane will be marked as Text; while the Cyan, Yellow and Black Tagged Object Bit-planes remain as Image. This results in ambiguity as to the correct object type for certain pixels when all four Tagged Object Bit-planes are processed.

Accordingly, a mechanism to accurately identify objects during generation of Tagged Object Bit-planes is desired.

SUMMARY

In one embodiment, a printing system is disclosed. The printing system includes an interpreter module to generate Tagged Object Bit-plane data corresponding to drawing objects for each colorant of a device color space during rasterization a print job data and a common buffer to store the Tagged Object Bit-plane data for each colorant.

In a further embodiment, a method is disclosed including generating Tagged Object Bit-plane data corresponding to drawing objects for each colorant of a device color space during rasterization a print job data and storing the Tagged Object Bit-plane data for each colorant in a common buffer.

BRIEF DESCRIPTION OF THE DRAWINGS

A better understanding of the present invention can be obtained from the following detailed description in conjunction with the following drawings, in which.

DETAILED DESCRIPTION

A mechanism to accurately identify objects during generation of Tagged Object Bit-planes is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A portion of the disclosure of this patent document may include material that is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

Figure 1:
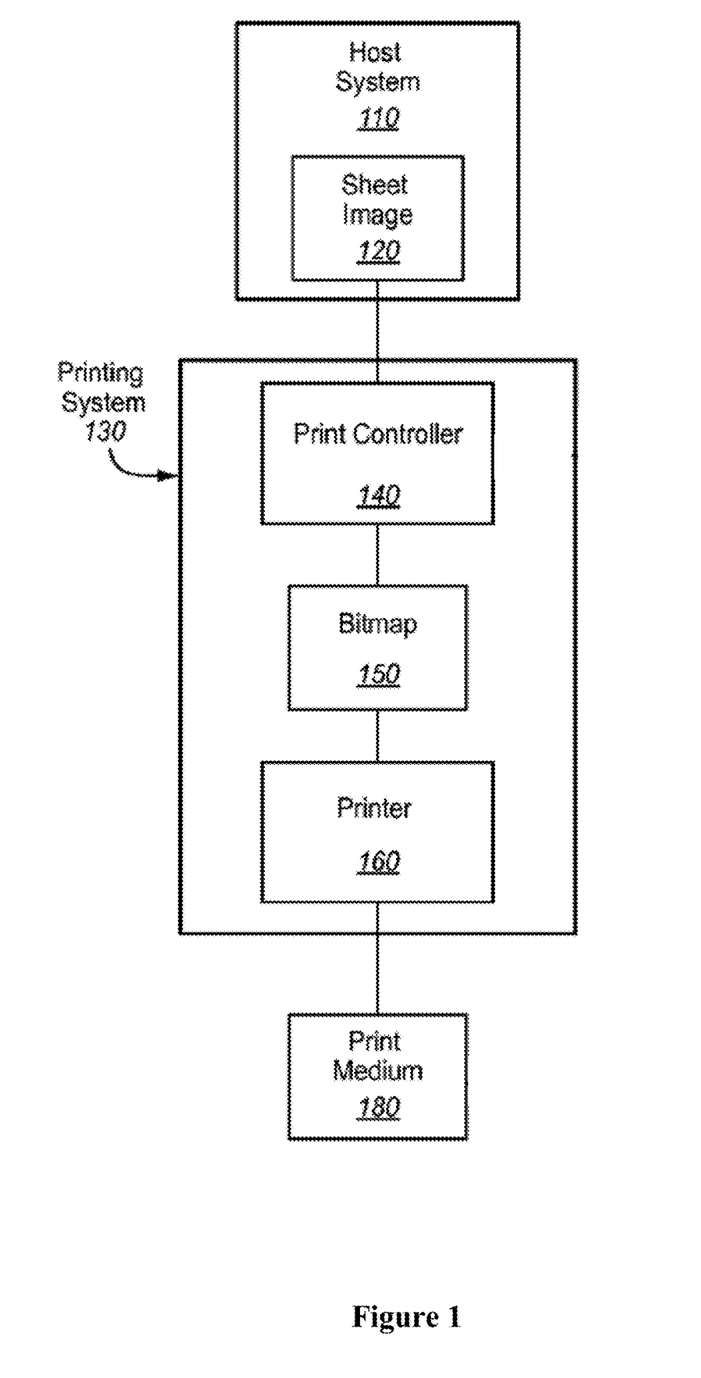
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any print job file or data that describes how an image on a sheet of print medium 180 should be printed. For example, the sheet image 120 may include PostScript data, Printer Command Language (PCL) data, PDF data and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 (e.g., Digital Front End, DFE) may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
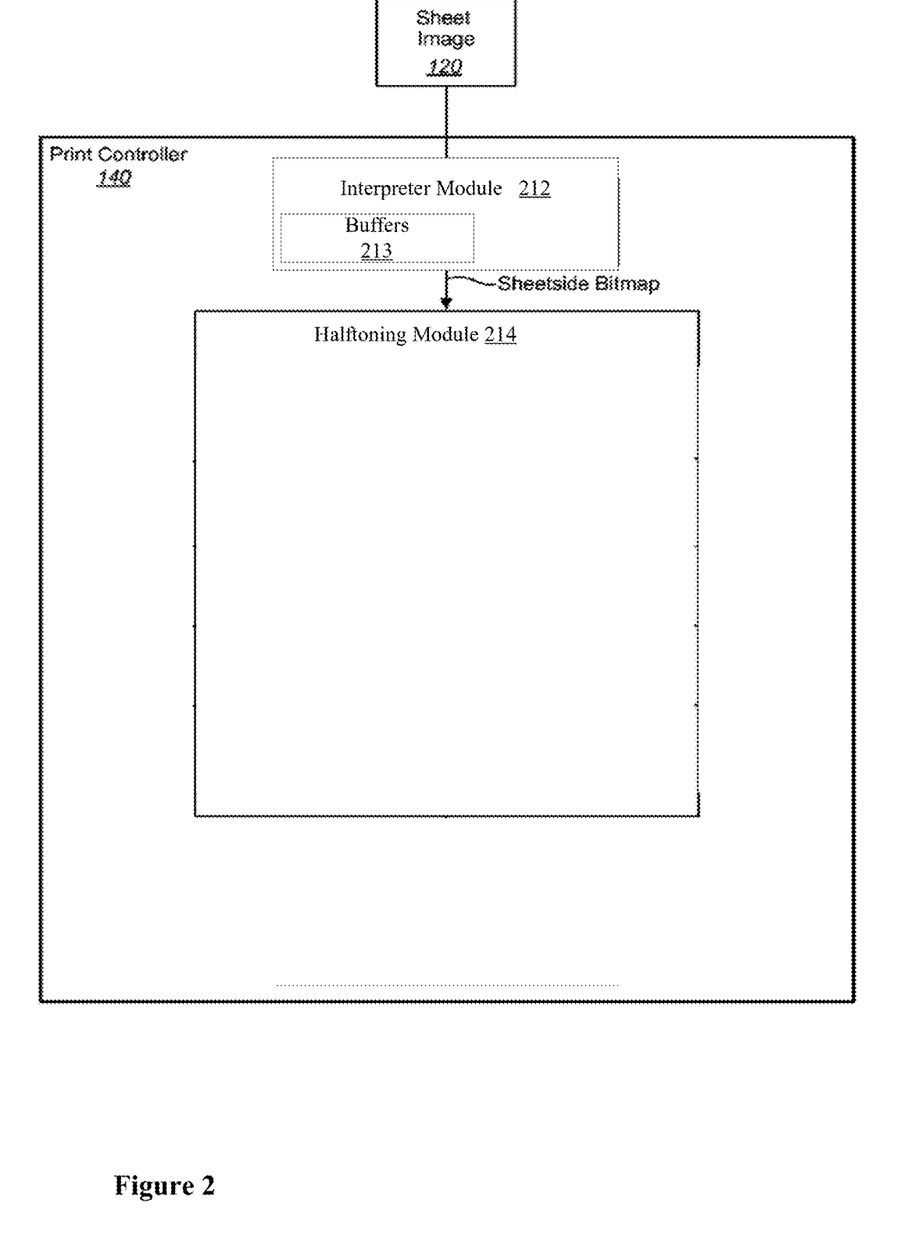
FIG. 2 is a block diagram of one embodiment of a print controller.

FIG. 2 is a block diagram illustrating an exemplary print controller 140. The print controller 140, in its generalized form, includes an interpreter module 212 and a halftoning module 214. These separate components may represent hardware used to implement the print controller 140. Alternatively or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pixels representing an image of the print job (i.e., a CTI), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines. In such an embodiment, interpreter 212 includes buffers 213 to store representations of the rendering work products.

The halftoning module 214 is operable to represent the sheetside bitmaps as halftone patterns in an output color space for display or printing. For example, the halftoning module 214 may convert the pixels to halftone patterns of CMYK toner (or ink, paint or other marking materials) for application to the media (e.g., paper, forms or other substrates). Thus, halftoning module 214 converts a contone image to a binary/multi-bit level image at the same dots per inch (dpi).

Figure 3:
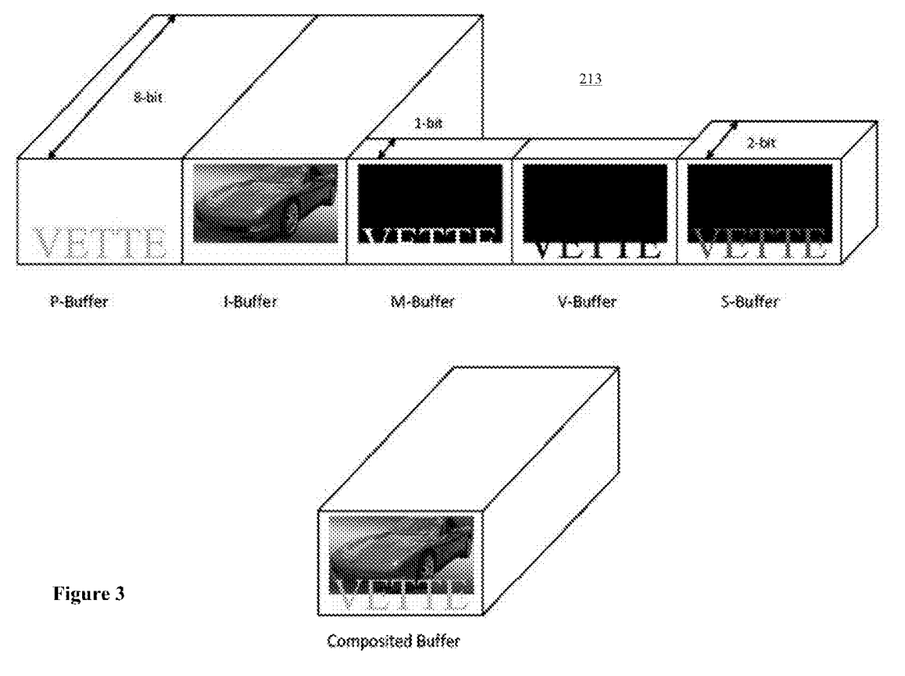
FIG. 3 illustrates one embodiment of object buffers.

FIG. 3 illustrates one embodiment of buffers 213. As shown in FIG. 3, buffers include a P-buffer, I-buffer, M-buffer, V-buffer, and S-buffer. The P-buffer and I-buffer are 8-bit text and image buffers, respectively. The M-buffer is a 1-bit mask buffer, while the V-buffer is a 1-bit valid buffer. The S-buffer represents a 2-bit Tagged Object Bit-plane buffer used for post rasterization processing. Additionally, buffers 213 include a composited buffer that includes a composite of the P, I, M, V and S buffers.

Figure 4:
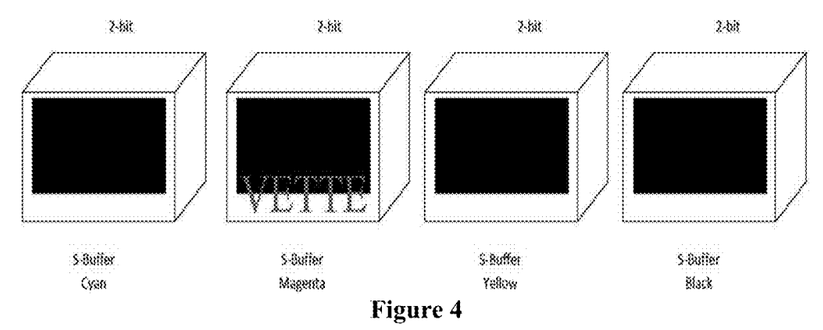
FIG. 4 illustrates a conventional Tagged Object Bit-plane buffer structure.

FIG. 4 illustrates a conventional S-buffer (also known as Tagged Object Bit-plane buffer) structure. As shown in FIG. 4, the conventional S-buffer includes a individual colorant buffers having different object types per CMYK colorant. As discussed above, the pixels describing an image in all four colorants are marked as having an object type of Image. However in FIG. 4, a Text object having a Magenta color space is applied on top of the image with overprinting enabled. Thus, only the pixels in the Magenta buffer are marked as Text, while the Cyan, Yellow and Black buffers remain as Image. Accordingly, an ambiguity exists as to the correct object type for certain pixels when all four buffers are processed.

According to one embodiment, buffers 213 include a single S-buffer that is implemented to enable accurate object marking. In such an embodiment, the S-buffer is marked with a correct tag identification (ID) regardless of the colorant being marked for the other buffers (e.g., P, I and V) in buffers 213.

In one embodiment, the memory layout for all buffers (e.g., P, I, M, V and S) is implemented as a contiguous block of memory for all of the colorants. In such an embodiment, a single memory pointer is used for addressing any buffer, and offsets into the memory are used to access each individual buffer. Using this scheme, the number of individual P, I, M, V and S buffers matches the number of colorants to be marked. Further, a specialized two-bit marker is used for marking the S-Buffer. Instead of adhering to the above-described addressing scheme, a two-bit marker will modify the memory address to that of the separately allocated memory area.

Figure 5:
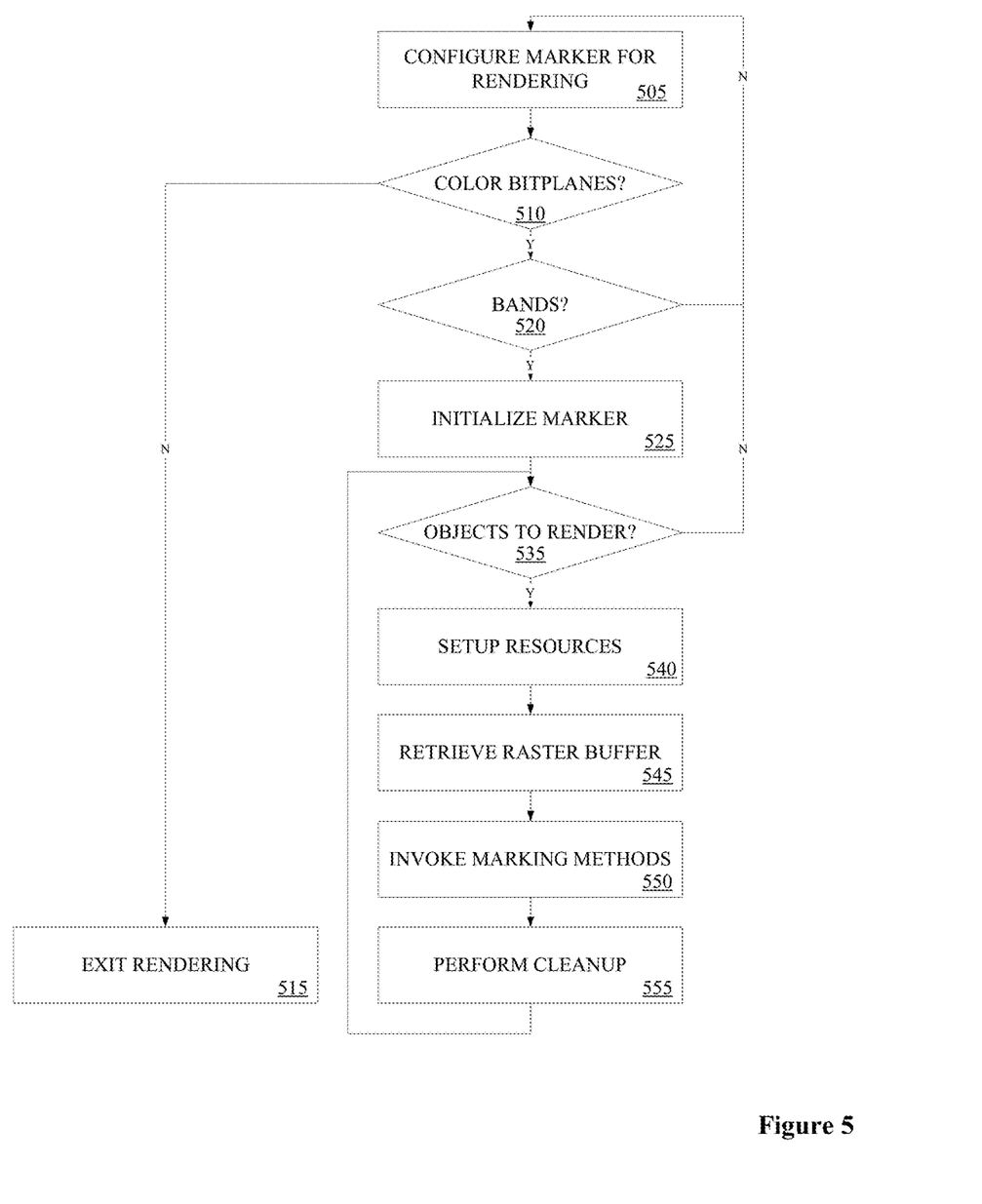
FIG. 5 is a flow diagram illustrating one embodiment of a rasterization process.

FIG. 5 is a flow diagram illustrating one embodiment of a rasterization/rendering process for generating a single tag bit-plane for multiple colorants into a single buffer. In one embodiment, Color-Major Ordering rendering is performed in which different bitmap rasters are generated at interpreter module 212 in the order of each colorant. Thus, for a CMYK device, the entire Cyan bitplane is first rendered, followed by the Magenta bitplane, followed by the Yellow bitplane and finally the Black bitplane. Other embodiments may feature different schemes (e.g., Band-Major Ordering). However, the scheme does not affect how the single common tag bitplane is generated and implemented.

At processing block 505, a marker for a colorant bitmap plane is rendered. Therefore, in Color-Major Ordering the marker for C is first configured for rendering, followed by each successive color. In one embodiment, the marker knows how to use the instructions (e.g., the converted objects within a Page Description Language) in generating raster output data that is written into the raster buffers. At decision block 510, a determination is made as to whether there are bit-planes to process. If each of the bit-planes (e.g., CMYK) has been processed rendering is exited due to completion, processing block 515.

If there is a determination that a bit-plane is to be processed, a further determination is made as to whether there are bands for the color bit-plane to be processed, decision block 520. If not, control is returned to processing block 505 where the next colorant bitmap marker is rendered. Otherwise, the marker for the color bit-plane being processed is initialized, processing block 525.

At decision block 535, a determination is made as to whether there are drawing objects for the color bit-plane that are to be rendered. If not, control is returned to processing block 505 where the next colorant bitmap marker is marked for rendering. Otherwise, resources (e.g., for marking, color, screens, etc.) are set up, processing block 540.

In one embodiment, resource setup includes identifying a unique halftone screen for each object type. In a further embodiment, the object screen information is used for marking the S-Buffer with the correct tag ID when the marker is presented a device primitive and marking instructions. In yet a further embodiment, the marker uses the same S-Buffer tag ID during marking with the object tag ID.

Figure 6:
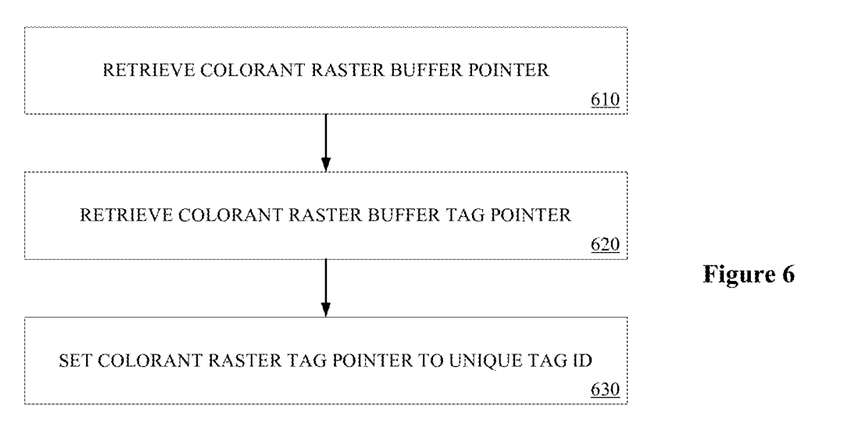
FIG. 6 is a flow diagram illustrating one embodiment of raster buffer rendering.

At processing block 545, the raster buffer for the particular colorant is retrieved for rendering. FIG. 6 is a flow diagram illustrating one embodiment of raster buffer rendering. At processing block 610, a colorant raster buffer pointer is retrieved. At processing block 620, a colorant raster buffer tag pointer is retrieved. In one embodiment, the colorant raster buffer pointer is the address of the contiguous block of memory including the individual buffers for I, P, M, V and S buffers. Offsets are employed from this pointer to address the different buffers. At processing block 630, the colorant raster buffer tag pointer is set to a unique tag ID in the S-buffer. The colorant raster buffer tag pointer is separate from the contiguous memory block area. It is a single buffer allocated and used by all colorants.

Referring back to FIG. 5, marking methods are invoked for the drawing object after rendering of the raster buffer once the raster buffer has been retrieved, processing block 550. At processing block 555, a cleanup is performed. In such an embodiment, all of the associated resources for the current marking cycle are relinquished (e.g., the drawing object's color information, halftone information, etc.) in preparation for the next marking cycle of the next object. Subsequently control is returned to decision block 535, where it is determined if there are more objects to render.

Figure 7:
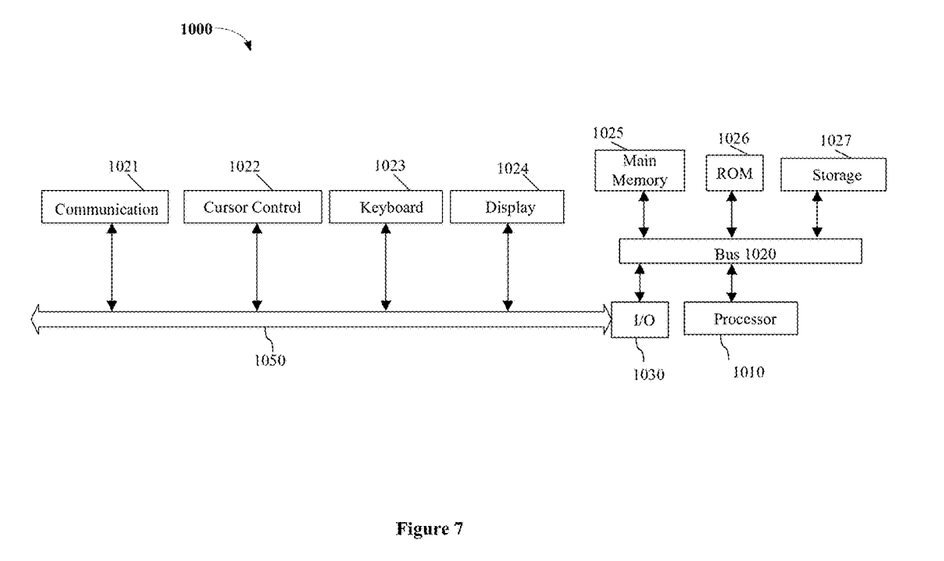
FIG. 7 illustrates one embodiment of a computer system.

FIG. 7 illustrates a computer system 1000 on which printing system 130 and/or halftone calibration module 216 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1025 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory machine-readable medium including data that, when accessed by a machine, causes the machine to perform operations comprising:
    receiving print job data;
    performing a rasterization to transform the print job data into a sheetside bitmap having raster bit plane data for each of a plurality of colorants of a device color space, including,
        identifying a colorant object type for each colorant of the plurality of colorants corresponding to a pixel, wherein a number of the identified colorant object types is greater than one;
        generating object identification (ID) data for the pixel based on a first of the identified colorant object types; and
        storing the object ID data in a common buffer;
    performing post rasterization processing on the raster bit plane data for each of the plurality of colorants of the pixel using the object ID data; and
    transmitting the sheetside bitmap to be printed by a printer.

2. The machine-readable medium of claim 1, wherein generating the object ID data comprises retrieving a raster buffer for a colorant.

3. The machine-readable medium of claim 2, including data that, when accessed by a machine, further causes the machine to retrieve a raster buffer pointer for the colorant.

4. The machine-readable medium of claim 3, including data that, when accessed by a machine, further causes the machine to retrieve a colorant raster buffer tag pointer for the colorant.

5. The machine-readable medium of claim 4, including data that, when accessed by a machine, further causes the machine to set the colorant raster buffer tag pointer to the object ID data stored in the common buffer.

6. The machine-readable medium of claim 3, including data that, when accessed by a machine, further causes the machine to retrieve a raster buffer for a second colorant.

7. The machine-readable medium of claim 6, including data that, when accessed by a machine, further causes the machine to:
    retrieve a second raster buffer pointer for the second colorant;
    retrieve a second colorant raster buffer tag pointer for the second colorant; and
    set the second colorant raster buffer tag pointer to second object ID data in the common buffer.

8. The machine-readable medium of claim 2, including data that, when accessed by a machine, further causes the machine to draw objects after retrieving the raster buffer for the colorant.

9. The machine-readable medium of claim 8, including data that, when accessed by a machine, further causes the machine to perform a cleanup.

10. The machine-readable medium of claim 1, wherein the post rasterization processing comprises selected halftone screening of the rasterized data of the pixel corresponding to the object ID data.

11. A printing system comprising:
    a processor to execute:

an interpreter module to perform a rasterization to transform the print job data into a sheetside bitmap having raster bit plane data for each of a plurality of colorants of a device color space, including identifying a colorant object type for each colorant of the plurality of colorants corresponding to a pixel, wherein a number of the identified colorant object types is greater than one, generating object identification (ID) data for the pixel based on a first of the identified colorant object types and storing the object ID data in a common buffer, performing post rasterization processing on the raster bit plane data for each of the plurality of colorants of the pixel using the object ID data, and transmitting the sheetside bitmap to be printed by a printer; and a storage device comprising a common buffer to store the object ID data.

12. The printing system of claim 11 wherein generating the object ID data comprises retrieving a raster buffer for a colorant.

13. The printing system of claim 12 wherein the interpreter module retrieves a raster buffer pointer for the colorant.

14. The printing system of claim 13 wherein the interpreter module retrieves a colorant raster buffer tag pointer for the colorant.

15. The printing system of claim 14 wherein the interpreter module sets the colorant raster buffer tag pointer to the object ID stored in the common buffer.

16. The printing system of claim 13 wherein the interpreter module retrieves a raster buffer for a second colorant.

17. The printing system of claim 16 wherein the interpreter module retrieves a second raster buffer pointer for the second colorant, retrieves a second colorant raster buffer tag pointer for the second colorant and sets the second colorant raster buffer tag pointer to second object ID data in the common buffer.

18. The printing system of claim 17 wherein the interpreter module draws the objects after retrieving the raster buffer for the colorant.

19. The printing system of claim 11 wherein the post rasterization comprises selected halftone screening of the rasterized data of the pixel corresponding to the object ID data.

20. The printing system of claim 11 further comprising a printer to print the sheetside bitmap.

* * * * *